Dec. 30, 1952 C. G. MUNTERS 2,623,364
METHOD OF AND APPARATUS FOR REMOVING MOISTURE FROM
THE INTERIOR OF THE WALLS OF COLD STORAGE ROOMS
Filed July 17, 1947 2 SHEETS—SHEET 1
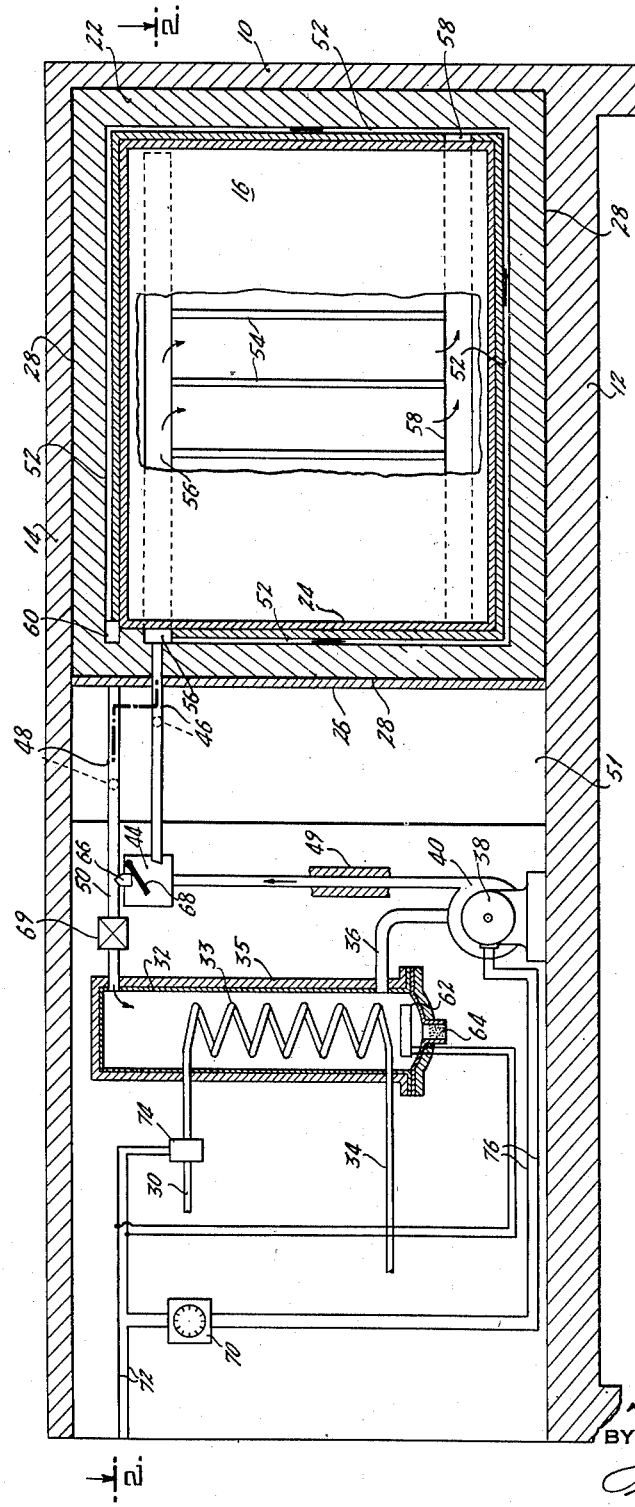
INVENTOR
Carl Georg Munters
BY
Jarvis C. Marble
ATTORNEY

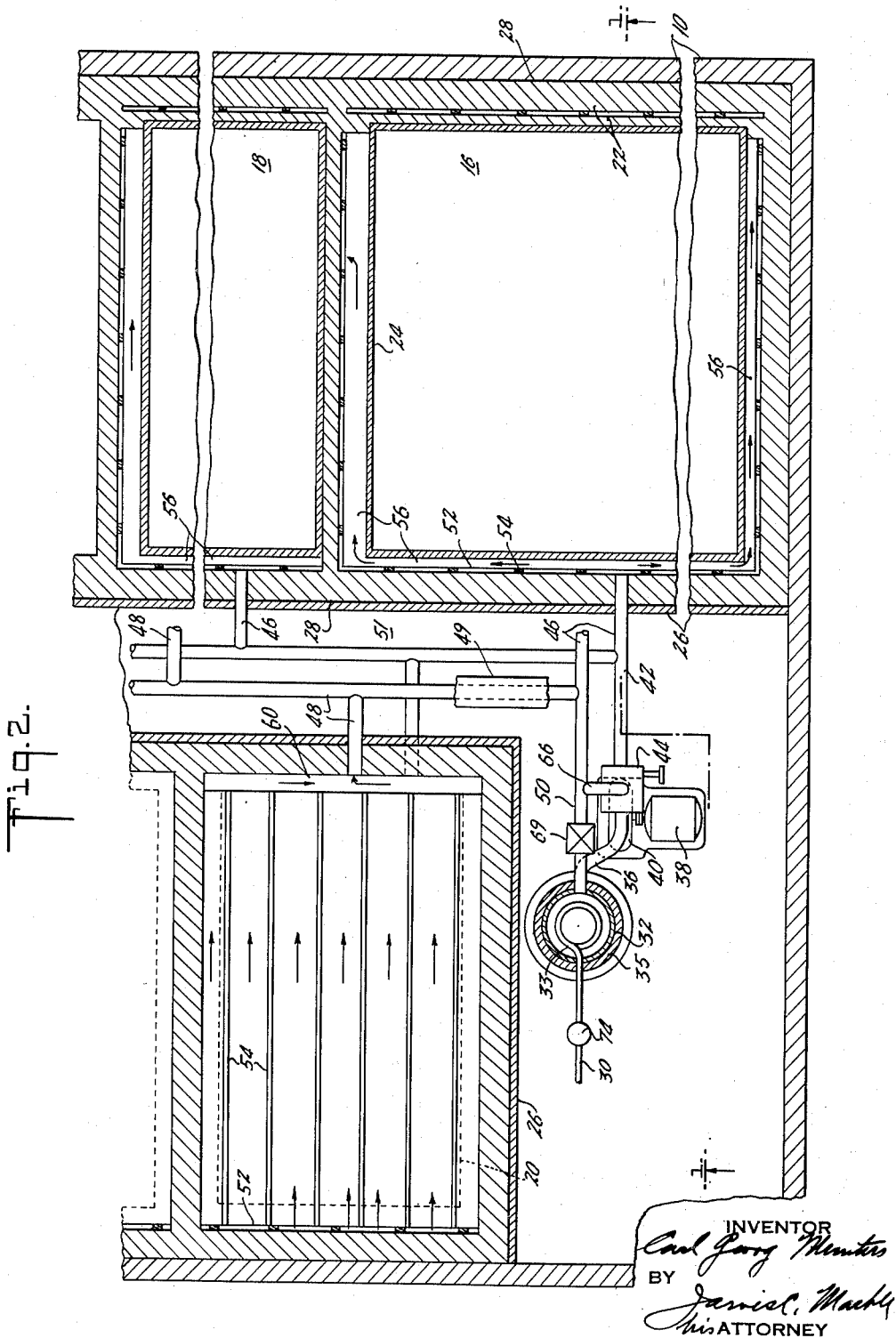

Patented Dec. 30, 1952

2,623,364

UNITED STATES PATENT OFFICE 2,623,364

METHOD OF AND APPARATUS FOR REMOVING MOISTURE FROM THE INTERIOR OF THE WALLS OF COLD STORAGE ROOMS

Carl Georg Munters, Stocksund, Sweden

Application July 17, 1947, Serial No. 761,682
In Sweden September 6, 1946

10 Claims. (Cl. 62—89)

The present invention relates to a method and means of counteracting the precipitation of moisture in the heat-insulating walls of cold storage rooms and buildings. It is known for this purpose to pass precooled and, consequently, relatively dry air through the walls, which air when subjected to an increased temperature within the walls will be capable of absorbing moisture contained therein. The impelling power required for the ventilation has hitherto been created by the natural draught produced as a result of providing at different levels direct or indirect communication between the interior of the walls and the cold storage room. The power which impels the air will be greater the greater is the difference in temperature between the cooperating air columns, but at the same time there will be an increase of the loss of cooling effect produced by the heating of the air of ventilation. From this point of view it is of advantage to dispose the circulation passage in the wall near the cold side thereof, the impelling power being then reduced, however, and in certain cases insufficient.

The present invention has for its object an improved method of ventilating the walls of cold storage rooms with the aid of a fan. In this way it will be possible to increase the impelling power far in excess of that obtainable by natural draught and the desiccating effect of the ventilation air will be improced in a corresponding degree. In heat insulation a chief object is to prevent as far as possible movement of the air contained therein, as still air is the best insulator, while moving air transmits heat by convection. Hence, it would be expected that the improved desiccating effect would be obtained at the cost of the insulating effect when an air current is produced within the insulation by means of a fan according to the invention. It is found, however, that the increase of the coefficient of heat transfer produced by the air current within the insulation is more than balanced by the improvement of the insulating capacity attained due to the fact that the moisture problem is effectively mastered. By the proper arrangement of defined paths of flow in the insulation, only a small portion of the air contained therein need to be brought into motion. Inasmuch as the impelling power is not limited to the natural draught, the conduits and pipes required for conveying the air may be made simpler, and, furthermore, may be disposed where they are the least in the way. On the other hand, the consumption of energy involved by the introduction of a fan is negligible. The invention also has the advantage that the desired desiccating effect is ensured with the provision of a less efficient moisture proof coating on the outer sides of the walls to counteract the penetration or diffusion of atmospheric moisture into the walls.

The invention will be found particularly advantageous in connection with cold storage buildings having a plurality of cold storage rooms, inasmuch as the same fan or fan system may be utilized for the ventilation of the walls of a plurality of such rooms. Moreover, it is of special advantage to convey the air in closed paths separated from the interior of the cold storage room and having the fan arranged in the same, in which paths the air on having been dried outside the walls is returned to the latter. Due to the fact that columns of air of the height of the cold storage room need not be utilized, the conduits may be disposed in places which are the most suitable from the point of view of assembly and space.

The invention will be described more in detail with reference to the embodiment illustrated by way of example in the accompanying drawings, further features characteristic of the invention being then also pointed out.

Fig. 1 shows a vertical section through a portion of a cold storage building, wherein the walls of the cold storage room are ventilated in accordance with the invention, this figure being a section taken on line I—I in Fig. 2; while Fig. 2 is a section taken on the line II—II of Fig. 1.

In the drawings, reference characters 10, 12 and 14 designate the walls, a floor, and a roof, respectively, of a cold storage building or of a story thereof, which parts may be constructed from building materials in the ordinary way. In the embodiment shown, the cold storage building has a number of cold storage rooms, three of which, 16, 18 and 20, are illustrated in Fig. 2, and the walls of which contain an insulating material 22, which may be of any known kind. In the embodiment shown, the insulating material 22 consists of porous slabs, for instance cork, which on their sides have a covering 24 and 26 for instance of plaster or wallboard. Furthermore, the insulating material is provided, particularly on the warm side, with a coating 28 of a waterproofing material, sucht as asphalt. It is also advantageous to apply such a coating to the covering 26 and, if desired, to the covering 24 or the inside of the insulating material. Such coatings provide what may be termed diffusion barriers for minimizing the absorption of moisture by the insulating material.

The cold storage rooms are cooled by a refrigerating plant of a type known per se, which is not illustrated, since it is not relevant to the invention. Connected to the refrigerating machine or to a special refrigerating machine is a conduit 30 which extends into a demoistening container 32, in which it preferably is in the form of a coil 33, in order to provide sufficient refrigerating surface. Extending from the coil 33 is a return conduit 34 for the cooling medium of the refrigerating machine, which medium is evaporated, if desired. The container 32, which is preferably surrounded by an insulating layer 35, is connected through a conduit 36 to a fan 40 driven by a motor 38. One side of the fan, preferably the exhaust side thereof, is connected with the interior passages within the walls of the individual cold storage rooms through a conduit 42 and branch conduits 46, a distributing valve 44 being inserted in conduit 42. From the passages within the walls, the air passes through branch conduits 48 and a conduit 50 back to the container 32. The conduit 50 may open into the upper part of the latter, whereas the conduit 36 is connected to the container at the bottom thereof. The conduits 46 and 48 are preferably arranged in the roof of a corridor 51 or the like, the same being located, for instance, between the cold storage rooms, which are provided with doors (not shown) towards said corridor.

Arranged in the respective walls of the cold storage rooms are channels, so that the air impelled by the fan will pass through these channels in predetermined paths. The channels are constituted partly by spaces 52 extending about all sides of the refrigerating chamber and disposed in the present case inwardly from the center of the walls, and partly by distributing and collecting channels in the upper and lower parts of the cold storage room. The spaces 52 may be obtained by the provision of spacing elements between two slab layers, such as bars 54, which are joined, if desired, by means of wires, into a mat adapted to be rolled out to facilitate the erection of the walls. The longitudinal direction of the bars extends parallel with the desired direction of flow of the ventilation air through the respective sides of the cold storage room. Distributing passages 56, which are in this case disposed in the upper part of the cold storage rooms, are each in communication with a branch conduit 46 and extend about two or three sides of the cold storage room. The relatively dry air entering through the conduit 46 follows the distributing passage 56 and flows downwardly in the spaces 52 at the three sides of the cold storage room. The space 52 at the central of these side walls communicates with the space in the floor of the cold storage room, while the spaces of the other side walls communicate with a collecting passage 58 extending along these walls and the fourth side wall, which has no distributing passage 56 at the top. At this fourth side wall, the air currents from the floor and the channel 58 meet and then pass upwardly through the space 52 in the side wall in question, and continue along the roof space 52 to a collecting channel 60 communicating with the return branch conduit 48. In this way all walls of the cold storage room, which conception here includes the floor and the roof thereof, have dry ventilation air flowing therethrough. The chamber 18 has a wall in common with the chamber 16, which wall is ventilated through the distributing passage 56 pertaining to the chamber 16. Therefore, the ventilation system for the chamber 18 need not include the wall which is common to the two chambers.

The distributing and collecting passages such as 56 and 60 may for convenience be considered as primary or header passages while the passages which are in diffusion relation with the heat insulating material may be considered as secondary passages which are supplied from the header passages and which may be of smaller individual cross-sectional area than the latter.

Arranged, for instance, at the bottom of the demoistening container 32 is a heating apparatus, such as an electric resistance element 62. Provided at the bottom of the container is a drain opening, in which may be inserted a plug 64 of fibrous material or the like.

The conduits 42 and 50 communicate with each other through a conduit 66, so that a portion of the air leaving the fan 40 passes directly back to the container 32. The volume of this air quantity is regulated with the aid of a throttling damper 68, which regulation may be effected at the initial adjustment of the ventilation system and ordinarily need not be changed thereafter. The ventilation system may be so adapted, for instance through a throttle valve 69 provided in the conduit 50, that a certain pressure above atmospheric will prevail in the walls of the cold storage room to prevent leaking of air into the same.

The heating element 62 is preferably caused to function with the aid of a time relay 70, which is connected in the electric supply system 72 for the element. This supply system may also be connected to a magnetic valve 74 provided in the conduit 30 for the cooling medium, which valve may be constructed as shown in my copending application, Serial No. 731,253, filed February 27, 1947. The time relay 70 may also control the starting device of the motor 38 through wires 76.

The arrangement operates in the following manner:

The air delivered by the fan 40, which air has been precooled and dried in the container 32 to a temperature below the lowest temperature in the interior of the walls, and preferably to a temperature lower than that in the interior of the cold storage room or rooms, is introduced into the passages in the various walls of the cold storage room through the conduit 42 and the branch conduits 46, and passes through these passages in the manner described above. Meanwhile the air absorbs moisture from the insulating material while being heated at the same time. The air thus enriched in moisture passes through the branch conduits 48 and the conduit 50 back to the container 32, in order again to be dried and cooled. Simultaneously with this circulation a portion of the air passes from the pressure side of the fan through the conduit 66 directly back to the container 32, whereby effective drying of the air is ensured. After a certain time, moisture has precipitated in the form of ice and snow on the coil 33 in such a quantity that defrosting is necessitated. This takes place automatically, the time relay closing the circuit to the heating element 62 while at the same time interrupting the supply of cooling agent through the conduit 30. In the embodiment shown, the motor 38 is also stopped by the time relay 70, as otherwise the air would flow during the defrosting process into the insulation of the cold storage room. This, however, would not be any great disadvantage, inasmuch as the defrosting period is of a comparatively short duration. It is also possible during the defrosting period to move the damper 68 into a position in which it closes the passage through the conduit 46. In this alternative arrangement, the fan will facilitate defrosting by maintaining the air within the container in motion, the heat cartridge being then placed in the upper part of the container. Instead of using the magnetic valve 74, the refrigerating machine may be stopped during the defrosting process.

Obviously, the invention is not limited to the embodiment shown, but may be varied in its widest aspects within the scope of the appended claims. If the insulation is of the multi-layer type, the bars 54 forming the passages 52 may be omitted, inasmuch as the air may then instead be directed over the distributing and collecting passages through the inner channel system of the multi-layer insulation, as will appear more specifically, for instance, from Patent No. 2,338,452 issued January 4, 1944, to David E. Ahlqvist and myself.

What is claimed:

1. In a device of the class described, heat insulated walls defining a plurality of cold storage rooms, said walls being formed with air circulating passages therethrough, a blower having an intake opening and a discharge opening, conduit means for connecting said discharge opening to the passages in the walls forming said plurality of rooms to supply air thereto, conduit means for connecting said inlet opening to said passages to withdraw air therefrom, means forming a chamber interposed in the last mentioned conduit means, cooling means in said chamber, a shunt connection between said discharge opening and said chamber, and valve means for controlling flow of air through said shunt connection.

2. A construction of the character described comprising wall structure defining a refrigerated room, said structure including heat insulating material and air circulation passages in diffusion relation with said insulating material, a mechanical air circulating device, air cooling means located exteriorly of said passages and means for connecting said passages, said cooling means and said circulating device in series to circulate air through the system to remove moisture from said insulating material and thereafter dry the air before returning it to said passages and means providing a shunt connection for by-passing a part of the air from the discharge side of said circulating device to the inlet side thereof without traversing said passages.

3. A construction as set forth in claim 2, including valve means for controlling the flow of air through said shunt connection.

4. A construction of the character described comprising wall structure for a cold room, said structure including heat insulating material and air circulating passages in diffusion relation with said insulating material, an air circulating device, an electric motor for operating said device, conduit means for connecting the inlet and outlet of said device with said passages for circulation of air through the passages, said conduit means including a drying chamber, cooling means in said chamber, electric heating means in said chamber for defrosting said cooling means, and electric switching means operable to simultaneously supply current to said heating means and to interrupt the supply of current to said motor.

5. A construction of the character described comprising wall structure for a refrigerated room, said structure including heat insulating material and air circulation passages, and mechanical means for producing forced circulation of conditioned air through said passages to effect removal of moisture from said insulating material, said passages including a multiplicity of secondary passages in diffusion relation with said heat insulating material and primary passages each communicating with a plurality of said secondary passages for distributing and collecting the air circulated through the secondary passages.

6. A structure as set forth in claim 5 in which the cross-sectional areas of the primary passages are greater than the cross-sectional areas of the individual secondary passages.

7. A construction of the character described comprising wall structure for a refrigerated room, said structure including heat insulating material, air circulation passages in diffusion relation with said heat insulating material over at least the major portion of the area of said wall structure, header passages for distributing air to and collecting air from the first mentioned passages, and means for forcing a supply of conditioned air through said passages independently of the refrigeration of the room and with substantially even distribution to effect removal of moisture from said insulating material.

8. The improved method of removing moisture from the interior of the heat insulating wall structure of a refrigerated room which includes the steps of cooling air independently of the refrigeration of the room to a temperature below that of the wall structure to dry the air, forcing the dried air to circulate in a path of flow confined to the colder portion of said wall structure in diffusion relation with the insulating material in the wall whereby to cause the air to absorb moisture from the insulation due to rise in temperature of the air, recooling air discharged from said wall structure in a zone separate from the interior of said room to remove moisture therefrom for recirculation through said wall structure and by-passing a controlled portion of the air from said cooling zone to mingle with air discharged from said wall structure.

9. In a construction of the character described a refrigerated room having walls containing insulating material and providing spaces confined to the region adjacent to the room faces of the walls for flow of air over substantially the entire areas of said walls in diffusion relation with the insulating material, header channels for supplying air to said spaces, said channels extending transversely of the direction of flow of the air through the spaces with which they communicate to provide substantially uniform flow of air over the areas of said spaces and means for forcing a supply of conditioned air through said header channels and spaces to effect removal of moisture from said insulating material.

10. In a construction of the character described a refrigerated room having walls containing insulating material and providing spaces confined to the region adjacent to the room faces of the walls for flow of air over substantially the entire areas of said walls in diffusion relation with the insulating material, header channels located in and confined to the region adjacent to the room faces of said walls for supplying air to said spaces, said channels extending transversely of the direction of flow of the air through the spaces with which they communicate and said channels communicating with said spaces at a plurality of separate places along the lengths of the channels to insure substantially uniform flow of air over the areas of said spaces and means for forcing a supply of conditioned air through said header channels and spaces to effect removal of moisture from said insulating material.

CARL GEORG MUNTERS.

REFERENCES CITED

The following references are of record in the file of this patent:

UNITED STATES PATENTS

| Number | Name | Date |
|---|---|---|
| 1,647,785 | Coughlin | Nov. 1, 1927 |
| 1,856,008 | Warren | Apr. 26, 1932 |
| 1,970,340 | Ruff | Aug. 14, 1934 |
| 2,016,608 | McDowell | Oct. 8, 1935 |
| 2,150,182 | Munters | Mar. 14, 1939 |
| 2,151,713 | Niemann | Mar. 28, 1939 |
| 2,334,513 | Shaw | Nov. 16, 1943 |
| 2,338,452 | Munters | Jan. 4, 1944 |
| 2,346,837 | Grooms | Apr. 18, 1944 |
| 2,497,713 | Becker | Feb. 14, 1950 |